United States Patent [19]
Cheston, III et al.

[11] Patent Number: 5,771,279
[45] Date of Patent: *Jun. 23, 1998

[54] ADVANCED INTELLIGENT NETWORK INTERACTING WITH CUSTOMER PREMISES EQUIPMENT

[75] Inventors: Frank C. Cheston, III, Potomac, Md.; James E. Curry, Herndon; Robert D. Farris, Sterling, both of Va.

[73] Assignee: Bell Atlantic Network Services, Inc., Arlington, Va.

[ * ] Notice: The term of this patent shall not extend beyond the expiration date of Pat. No. 5,526,413.

[21] Appl. No.: 508,428

[22] Filed: Jul. 31, 1995

[51] Int. Cl.⁶ .................................................. H04M 11/00
[52] U.S. Cl. .................................. 379/93.17; 379/93.14; 379/201
[58] Field of Search .................................. 379/94, 96, 93, 379/201, 207, 269, 112, 219, 210, 211, 212, 216, 220, 221, 230, 93.17, 93.23, 93.25, 93.14

[56] References Cited

U.S. PATENT DOCUMENTS

| | | | |
|---|---|---|---|
| 4,580,011 | 4/1986 | Glaser | 179/10 |
| 4,611,094 | 9/1986 | Asmuth et al. | 179/7.1 |
| 4,720,850 | 1/1988 | Oberlander et al. | 379/90 |
| 4,756,019 | 7/1988 | Szybicki | 379/112 |
| 4,987,587 | 1/1991 | Jolissaint | 379/94 |
| 4,996,704 | 2/1991 | Brunson | 379/67 |
| 5,204,894 | 4/1993 | Darden | 379/88 |
| 5,241,588 | 8/1993 | Babson, III et al. | 379/201 |
| 5,247,571 | 9/1993 | Kay et al. | 379/207 |
| 5,251,255 | 10/1993 | Epley | 379/242 |
| 5,282,244 | 1/1994 | Fuller et al. | 379/230 |
| 5,311,572 | 5/1994 | Friedes et al. | 379/67 |
| 5,323,452 | 6/1994 | Dickman et al. | 379/201 |
| 5,526,413 | 6/1996 | Cheston, III et al. | 379/201 |

OTHER PUBLICATIONS

Mazo et a. "General Characteristics of Intelligent Networks", Electrical Communication, vol. 63, No. 4, 1989, pp. 314–320.

van Hal et al, "Service Script Interpreter, an Advanced Intelligent Network Platform", Ericsson Review, No. 1, 1990, pp. 12–22.

De Sadaba, "Personal Communications in the Intelligent Network", British Telecommunications Engineering, vol. 9, Aug. 1990, pp. 80–83.

Berman et al "Perspectives on the AIN Architecture", IEEE Communications Magazine, Feb. 1992, pp. 27–32.

Dunogue et al, "The Building of Intelligent Networks, Architecture and systems from Alcatel", Communication and Transmission, No. 2, 1989, pp. 5–22.

R. Kopeikin, "ISDN Professional Service", Electrical Communiation, vol. 63, No. 4, 1989.

Newton, "Your Very Own STP" Teleconnect Aug. 1992.

Michael J. Strauss et al, U.S. Patent Application Ser. No. 08/504,305, entitled "Advanced Intelligent Network Having Digital Entertainment Terminal or the Like Interacting with Integrated Service Control Point", filed Jul. 20, 1995.

David F. Wheeler et al, U.S. Patent Application Ser. No. 08/248,980, entitled "Advanced Intelligent Network with Intelligent Peripherals Interfaced to the Integrated Services Control Point", filed May 25, 1994.

*Primary Examiner*—Stella Woo
*Attorney, Agent, or Firm*—McDermott, Will & Emery

[57] ABSTRACT

Telecommunications calls exchanged between customer premise equipment (CPE) and a switched telephone network receive AIN treatment within the CPE and within the network. An AIN architecture is employed in the CPE and in the network, and the signaling systems are interfaced to permit an exchange of signaling messages. A request message, originating either within the CPE or within the network, can be directed to a service logic provider either within the CPE or within the network (e.g., an AIN integrated service control point, or ISCP). In particular, the ISCP of the switched telephone network can be programmed by the customer premises equipment and vice versa to provide enhanced services. These may include a look ahead busy service in which a query is sent to determine whether equipment is busy before a communications call is connected.

18 Claims, 5 Drawing Sheets ns exchanged are carried out in a more seamless and
ADVANCED INTELLIGENT NETWORK INTERACTING WITH CUSTOMER PREMISES EQUIPMENT This invention relates generally to the processing of telecommunications calls that are exchanged between customer premise equipment (CPE) and an advanced intelligent network (AIN). In particular, the present invention relates to methods and apparatus for coordinating and integrating operations carried out in support of the calls, both within the CPE and the AIN, using at least one programmable integrated services control point (ISCP).

BACKGROUND OF THE INVENTION

Enhanced telephone networks, frequently referred to as advanced intelligent networks (AIN), provide network operators with considerable flexibility and economy in structuring their product offerings and providing their customers with numerous telephone conveniences and services. In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database.

The ISCP is essentially a central control for the network. If needed, it can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

The typical AIN architecture allows the switched transport network to interact with database systems and other so-called intelligent peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call.

In recent years, a number of new service features have been provided by AIN Networks. In AIN type systems such as that disclosed in commonly assigned U.S. Pat. No. 5,247,571 to Kay et al, the entire disclosure of which is incorporated herein by reference, announcement and digit functions may be provided for certain specific services. For example, a caller may be prompted by a tone or speech announcement to enter a personal identification number (PIN) before obtaining a selected service or modifying certain stored parameters relating to the subscriber's AIN service. Nodes are usually added to the telephone network, separate from the switching office, to provide the announcements and related enhanced service features.

AIN databases are typically accessed via a common channel signaling system—a separate network used for out-of-band signaling. This architectural scheme is the basis for a diversity of network services.

AIN techniques are employed by both interexchange and local exchange carriers. For some applications, the attendant common channel signaling systems of multiple carriers have been interconnected so that signaling information can be exchanged for coordinating operations in support of certain telephone services involving both carriers. For example, an interexchange carrier's common channel signaling system and that of a local exchange carrier may be interconnected through a signal transfer point so that signals can be exchanged relative to special service telephone calls involving both carriers, examples of which are such things as "800" calls and calling card calls where number verification is needed.

Concomitant with the advances in AIN technology, significant advances have also been made in the customer premise equipment (CPE)—that apparatus which makes up the terminus equipment between which telecommunications calls are extended through the carrier networks. While CPE may be no more than a simple telephone, it also may be quite complex and include such things as private branch exchanges (PBXs), computers interconnected by local area networks (LANs), and other intricate arrangements of terminal equipment and peripheral devices (e.g., facsimile machines, video terminals, databases, and so forth). The make-up of CPE is diverse, and it continues to become more so. The composition of CPE used in a typical residential setting, for example, is changing rapidly as computers are increasingly used in the home, and as such things as video, information, and interactive services "on demand" begin to become commercial realities. The components of residential CPE, as is perhaps more typical in a business setting, may also be interconnected in a local area network. The CPE, both residential and commercial, has lately taken on the attributes of a network unto itself.

Although the combined advances in intelligent networking and customer premise equipment have together resulted in a very effective telecommunications system, the advances on the two sides have been made somewhat independently and not always with a view as to how the operations of each might be coordinated and integrated with the other for even more effective communications. Known networks makes little use of the additional capabilities of modern customer premises equipment.

On the CPE side, the various internal operations and control of calling features may be carried out in various ways, but that is usually done internal to the CPE, or only after a call has been put to the network where AIN processing is available. Within the CPE the scope of operations is virtually always limited by the resources available. For example, certain CPE may be able to perform conference calling operations, or do voice recognition, or provide recorded vocal announcements to its users, but once the limited resources for these are exhausted by use, the function has to be denied until the required resource is freed up. There may be no alternative resources to turn to.

On the network side, the AIN operations are usually carried out entirely within the boundaries of the network. A telephone call, for example, receives AIN treatment only after it enters the network (the "network" takes diverse forms, of course). Typically, the CPE, whatever its make-up, simply directs a call to the network, and only there does it receive whatever AIN treatment it may provoke within the network. Thus, there is a need for better coordination between the CPE and network operations so that, for any particular service, operations in support of the telecommunications exchanged are carried out in a more seamless and integrated fashion. Because of the growing complexity of the CPE itself and because of the networking that is now being increasingly used internal to the CPE, there is also a need for switching and AIN-like processing capabilities within the CPE.

More specifically, there is a need for techniques that will allow the CPE to look both to the network and to its own resources for intelligence in controlling and routing telecommunications calls while they are being processed within the CPE, that will allow the CPE to derive intelligence from within the network and from within the CPE itself for routing and control of communications exchanged within its own confines, and that will allow the CPE to access and use resources that are available within the network in support of call processing conducted within the CPE. It has been desired that these same techniques operate conversely so that the network is facilitated in some cases to turn to the CPE for intelligence and resources for its use in processing telecommunications.

For example, in known AIN networks, services are generally developed and added through interaction with the ISCP by telephone company personnel at the central office of the public switched telephone network. Typically, a subscriber must call a computer operator at the telephone company who has a direct link to the ISCP and who initiates or changes AIN services on behalf of the requesting subscriber. Such a system fails to take advantage of the additional capabilities provided by modern customer premises equipment.

Also, while there is some interaction between customer premises equipment and the AIN network, it is generally not related to the switching or routing of telephone or other services. To date, the AIN telephone network has been a separate technical area of development, with at most limited interaction between the AIN and the customer equipment.

As AIN services become more prevalent and sophisticated, it has become desirable to create individual customized services, such as announcements and call routing, for each customer. U.S. Pat. No. 4,611,094 to Asmuth et al discusses a method and apparatus for implementing customized service procedures for individual customers of a telephone network using an off-line computer system. However, the system in Asmuth et al disadvantageously required a computer programmer to write program sequences to define the customized service.

U.S. Pat. No. 5,241,588 to Babson et al discusses an improved method for the creation and execution of customized call processing information (CCPI) records stored in an ISCP to provide the desired service. The CCPI records are created by an operator at a display terminal to provide a visual representation of the desired service in the form of a flow chart referred to as a service "graph." New customized services are created or existing services are modified in a graphical environment by creating or modifying a customer's service graph on the display terminal. The displayed service is translated into a binary representation and data corresponding to the service graph is then stored in the ISCP. Thus, each individual customer can have customized telephone services implemented for them.

The patent has a plethora of figures illustrating the various computer screen displays. FIG. 33 of the patent illustrates a flow diagram of the operation of a service creation portion to create a new graph. FIGS. 52 to 62 are flow diagrams of the various other operations that provide for service creations.

Babson discusses a customized service (CS) application to create and, in certain circumstances, execute each customer's service procedure or program. Each customer's service program is stored as a record or a series of records of customized call processing information (CCPI) in the ISCP. The CS application includes a programming interface with permits an operator to use the CS application to create various user interfaces to obtain information, directly or indirectly, in a manner which is relatively easy to use. The information is used to generate the CCPI records automatically.

Each customer's service procedure or program can be executed in a call processing environment to process calls to or from a phone number identified by the customer, in accordance with the customer's desires. The method provides services for individual customers of a telephone network in response to customer requests through the following steps (executed by a data processor): storing a plurality of customer service procedures, each of the customer service procedures corresponding to a different one of the customers of the network; receiving requests at the ISCP for custom customer services from a switch of the network for information as to how to process the call; determining the custom customer service procedures corresponding to the received requests; retrieving from a customized procedure storage means the custom customer service procedures corresponding to each of the requests; sending instructions from the ISCP to the switch; and executing the retrieved service procedures to provide the customized services for the customers. The patent also has an alternate method for executing a procedure that involves testing conditions requested by the customer and taking action in accordance with the results of the test.

The hardware of the system is depicted in FIG. 3 and described in Column 9, lines 20–44. The architecture of the software is described in Section B, beginning in Column 10, line 47.

However, the Asmuth et al and Babson et al patents only offer a limited number of telephone services and do not disclose interaction between the public switched network and customer premises equipment. Furthermore, the customized telephone service is not directly created by a subscriber or from customer premises equipment. Instead, a subscriber usually customizes their service in a two-step process. In the first step the subscriber calls the telephone company and verbally indicates the desired telephone services to a telephone company employee. The subscriber's service is then subsequently set up or modified by a telephone company technician using a computer in a Service Creation Environment (SCE) which is within the ISCP on the company's premises and separate from the subscriber telephone lines of the network. Consequently, the customized telephone service is not requested or created at the telephone line at which the service is to be applied.

This process is believed to be unnecessarily expensive and to cause delay since the subscriber may have to wait to speak to a person at the telephone company who will receive the verbal request for customized telephone service. There may also be another delay before the request is entered. These delays may deter some subscribers from requesting customized telephone services. Human errors may also be introduced in either one of the steps. For example, the subscriber's verbal request may not be understood correctly over the telephone or the service may not be correctly input into the computer.

SUMMARY OF THE INVENTION

Therefore, it is an object of the present invention to provide methods and apparatus which will meet the needs discussed above.

It is also an object of the present invention to coordinate and integrate operations carried out in support of telecommunications exchanged between CPE and a switched telecommunications network.

It is a further object of the invention to provide for coordination and control of communications that remain within the CPE itself.

It is an object of the present invention to permit a customized service record to be directly requested and created by the customer over the telephone line at which the service is to be applied.

It is also an object of the present invention to more closely integrate elements of the AIN telephone network and the customer premises equipment, particularly for purposes of programming one or more ISCPs.

It is a further object of the present invention to provide a telephone network which offers customization of telephone services, enhanced capabilities and other service features, such as look ahead busy, through interactions with the central database from customer premises equipment, which take into consideration the abilities of modern customer premises equipment.

The present invention is based upon a realization that numerous advantages would be gained by more closely integrating elements of the AIN telephone network and customer premises equipment, particularly for purposes of controlling routing of telephone services using services such as look ahead busy. Signalling messages are exchanged between a customer premises network and the public network to coordinate and integrate operations of the two networks, e.g., to exchange service programming information or to exchange line status information.

To achieve these advantages, a preferred embodiment of the invention contains a customer premises ISCP and a signaling interface between the customer premises equipment and the signaling network of the public switched telephone network. The database in the CPE ISCP functions in a manner analogous to the ISCP of the AIN network and would interact with ISCP's and/or SCP's operated by other carriers connected to the public network, to provide a wide range of enhanced services. The CPE ISCP also controls on-premises communications and other operations of the on-premises PBX's. The functionality of the ISCP may be implemented by hardware as a dedicated piece of customer premises equipment, by software or by some combination of the two.

Data and signaling links are used to commonly access both databases and/or set various triggers throughout the public and private AINs. In particular, a customer premises AIN comprises an ISCP controlling two or more switch type elements, all on the customer premises and connected to voice and signaling elements of the public network.

Preferably, on the CPE side, call control circuitry having some form of switching or routing functionality is employed for conducting some part of the processing operations. The call control circuitry that is employed depends on the nature and scope of the CPE. For larger installations such as businesses, the switching or routing functionality can be performed by PBX's or key systems. For smaller installations such as residential customers, multiple extension telephones and other communications devices compatible with telephone network communications devices connect to one or more personal computers (PC) which are programmed for handling telecommunications and which control interconnection of the customer premises devices and connection thereof to the public network. The CPE ISCP controls operations of the CPE call control circuitry. As with AIN switches in the network, the CPE call control circuitry is adapted or programmed to be responsive to AIN-like trigger events as a telephone call, for example, is being processed. Similar switching and control functionalities can also be applied to data services and broadband services.

Triggers can be set in the customer premises routing equipment as well as in the switching offices of the public network as needed. Detection of a trigger event in the CPE processing, or by an AIN switch performing the network processing, causes the triggered call control means to formulate a request message soliciting information or some support action in order for the call processing operations to be continued. Because the signaling systems of the CPE and the network are interfaced to each other, the request message, whether it originates within the CPE or within the network, can be directed to a service provider either within the CPE or within the network (e.g., an AIN integrated service control point, or ISCP). The request message may call for routing or other information or it may express a need for auxiliary support resources or equipment (e.g., a request that a voice announcement unit be made available). In the latter case the call control means seeks information for access to the resource or an indication that the resource will be provided. Regardless of the origin of the request, the required resource may be sought either in the CPE or in the network.

The service provider, as in AIN processing, carries out a service logic program to produce the information that the call control means requires in order to continue its processing. The resultant information is forwarded to the requesting call control means by way of the interconnected signaling systems. Once the requesting call control means receives an indication that the triggering event has been satisfied, the call processing therein continues. For any given call, there may be multiple or repeated triggers encountered for completing the call processing.

The on-premises network also has an out of band (e.g., SS#7) signaling connection to the common channel interoffice signaling network of the public network and means to provide out of band signaling. Preferably, the signaling connection comprises direct access from a customer premises PBX to the carrier's common channel signaling network.

Telephone calls and other telecommunications exchanged between the customer premises equipment and the switched telephone network are afforded AIN treatment both within the CPE and within the network, and the overall processing operations are coordinated and integrated so that the CPE can draw upon the network for alternate information and resources and the network can likewise draw upon the CPE. More specifically, as different portions of the end to end network need resources not available therein, those portions of the network would automatically communicate with other portions of the network to obtain the necessary resources.

For example, if the customer premises equipment includes a plurality of PBX's having conference bridges, when a caller asks for a conference call through one PBX, but the bridges in that PBX are busy, the database would control the PBX's to set up the call through a conference bridge in the other PBX, without requiring any further action by the caller. Similarly, if no conference bridge were available in either PBX, the customer premises equipment would set up the conference call through the local exchange carrier facilities. In a similar manner, the local exchange carrier and interexchange carriers could access each other's resources on an as-needed basis through AIN interactions.

Common access to the on-premises database and the databases of the public network may be provided through software and/or terminal devices maintained on the customer's premises. The present invention provides common access programming of both customer premises equipment and public network type AIN function from the customer premises via the signaling link. For this feature, the customer premises could have SPACE type graphical user interface software to develop new services. The software may run on a separate terminal device or on the PC storing the customer premises control database. The customer uses the software to develop a new customized service, and appropriate call processing records are set up in the customer premises database and in the public network ISCP.

With an AIN architecture employed in both the CPE and in the network, the signaling systems of the two are tied together through an interface that permits the exchange of ancillary signaling messages. Extension of the signaling network and AIN signaling and routing control functionality into the customer premises facilitates AIN type routing using customer controlled data and extension of "look-ahead-busy" features to the customer premises equipment. For calls to the customer premises network, the public network would inquire via the CCIS link as to whether or not a specific called terminal device was busy. The public network would connect the voice portion of the call to the customer premises equipment only upon learning that the called terminal device was not busy, regardless of whether or not a line or trunk to the customer premises might be available. Similarly, on outgoing calls, the customer premises equipment would query the public network via the CCIS link as to whether or not a called line was busy. The customer premises equipment would connect the voice portion of the call to the public network for actual routing only upon learning that the called line was not busy.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
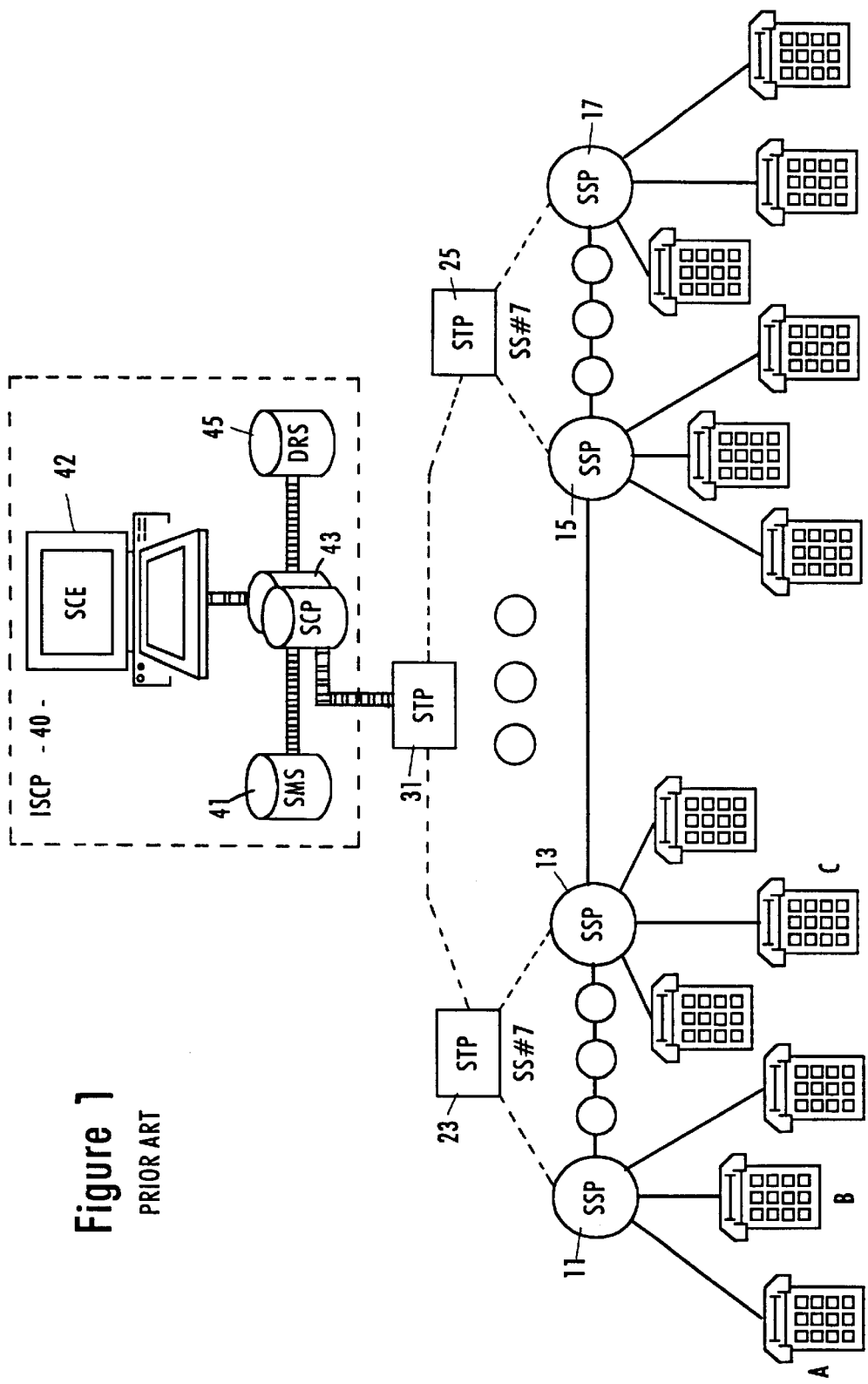
FIG. 1 is a schematic block diagram of advanced intelligent network architecture in a public switched telecommunications network.

FIG. 1 is a schematic block diagram of the components of a conventional AIN. In this figure, each of the CO's are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In FIG. 1, the COSSP's are end offices.

SSP's can be programmed to recognize a number of different triggers as an indication that a call is an AIN call. The trigger can relate to the terminating station or the identification of the telephone line from which a call or other request for service originates. For example, for a Centrex type service, a number of lines are designated as members of a business group serviced by an Area Wide Centrex. The SSP's then trigger AIN type servicing based on origination of the call or service request from a line subscribing to the service.

As shown in FIG. 1, all of the CO's 11, 13, 15 and 17 are equipped and programmed to serve as SSP's. The illustrated embodiment is perhaps an ideal implementation which would make a variety of Advance Intelligent Network AIN services widely available at the local office level throughout the network. Other AIN implementations provide the SSP functionality only at selected points in the network, and end offices without such functionality forward calls to one of the SSP's.

Such central office switching systems typically consist of a programmable digital switch with CCIS communications capabilities. One example of a SSP capable switch is a 5ESS type switch manufactured by AT&T; but other vendors, such as Northern Telecom and Seimens, manufacture comparable digital switches which could serve as the SSP's. The structure of an exemplary CO which may serve as the SSP type CO's in the system of FIG. 1 will be discussed in more detail below, with regard to FIG. 2.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. Although not shown, the central offices or SSP's are interconnected to each other by trunk circuits for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. Also, certain switching offices within the network, whether SSP's or not, may function primarily as tandem type offices providing connections between trunk circuits only. The links 23 and 25 between the CO'S and the local area STP's are dedicated CCIS links, typically SS#7 type interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

As shown in FIG. 1, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual business customer. The components of the ISCP are connected by an internal, high-speed data network, such as a token ring network (not shown).

Conventionally, a subscriber's individual service is set up and modified by a telephone company technician using the Service Creation Environment or SCE 42 in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all calls would be input by the technician using the SCE 42. As discussed more later, the present invention permits a subscriber to execute these service programming functions from the customer's on-premises network.

Although shown as telephones, the terminals in FIG. 1 can comprise any communication device compatible with the line. Where the line is a standard voice grade telephone line, for example, the terminals could include facsimile devices, modems etc.

Figure 2:
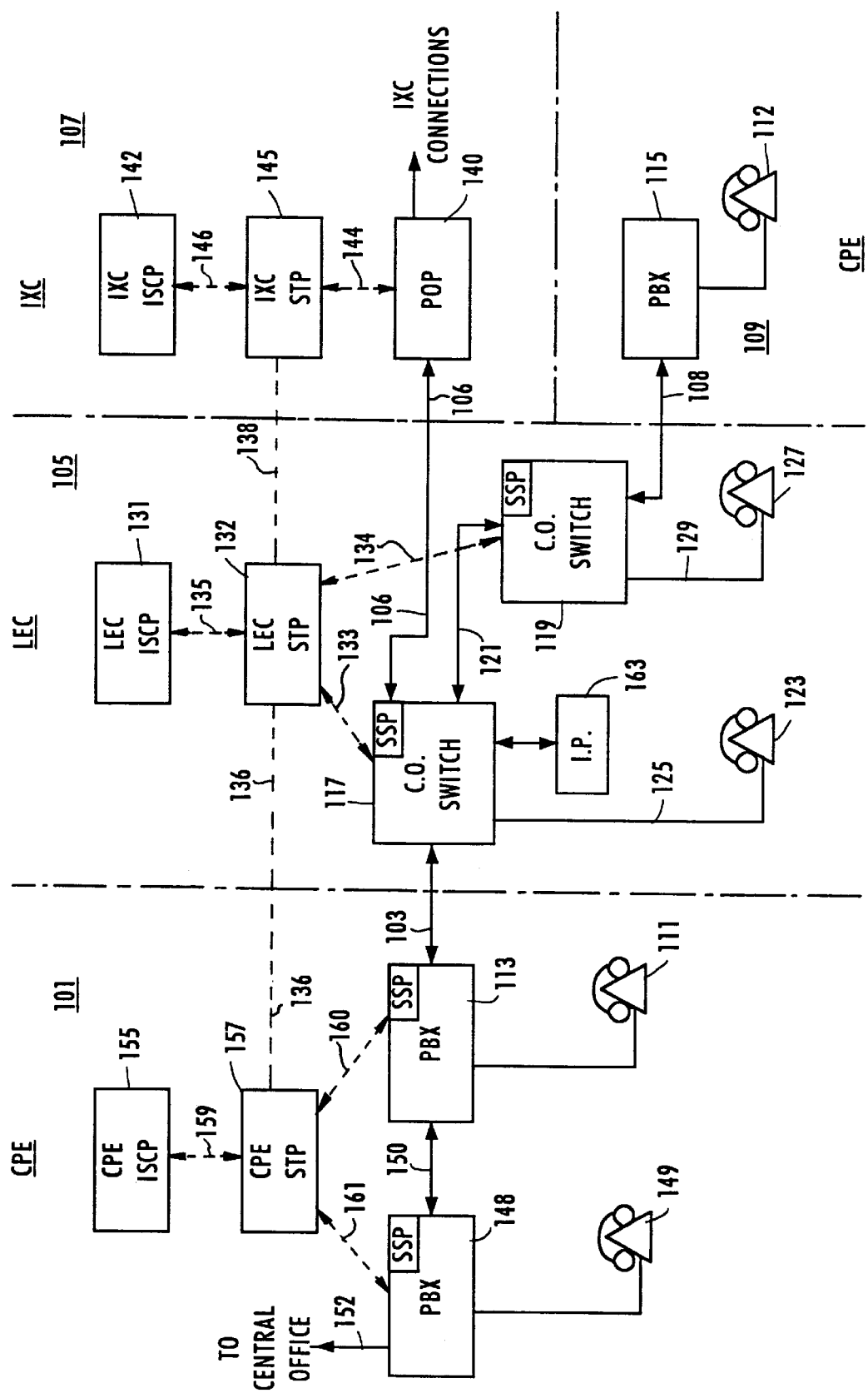
FIG. 2 is simplified block diagram showing an arrangement of CPE interconnected with a public switched telecommunications network according to a preferred embodiment of the present invention.

FIG. 2 very schematically illustrates one architectural framework for operation of a preferred embodiment of the invention. That drawing broadly depicts an end-to-end telecommunications system made up of a first group of customer premise equipment (CPE) 101 having an interconnection 103 to a local exchange carrier (LEC) network 105. On the other hand, the LEC network 105 connects by trunking connection 106 to an interexchange carrier (IXC) network 107 and by connection 108 to a PBX within customer premise equipment 109. To accommodate the description of the invention, these parts of the generalized system are illustrated in FIG. 2 to be divided by dot-dashed lines. It will be understood, of course, that while the figure does not show the many interconnections and elements that necessarily make up a complex telecommunications system of this kind, it does show the essential details for developing an understanding of the invention, as will be appreciated by those of skill in the art.

It will be helpful initially to follow the path and processing of an ordinary telephone call within the system without involvement of the invention. For that purpose, it may be assumed that a caller desires to place a call from the telephone terminal 111, located within the CPE 101, to another telephone terminal 112, located within the CPE 109. As illustrated, CPE 101 includes a private branch exchange (PBX) 113 to which the originating telephone 111 is connected, and the CPE 109 includes a PBX 115 to which the called telephone 112 is connected. In the usual manner, when the telephone 111 goes off hook, a dial tone is provided from the PBX 113. With appropriate dialing from telephone 111, the call is connected to a central office switch 117 of the local exchange 105. The central office switch 117, recognizing that the call has to be passed to another central office switch 119 within the LEC 105, routes the call to that switch 119 by way of the interconnecting trunk 121. The terminating central office switch 119 then forwards the call to terminating PBX 115 which distributes it to the appropriate telephone, here telephone 112. Similarly, a call from telephone 111, for example, can be conventionally routed for this kind of "plain old telephone" service (POTS) to any of the other telephones illustrated, including telephone 123 connected to central office switch 117 via local loop 125, telephone 127 connected to central office 119 by way of local loop 129, and any other telephone (not illustrated) accessible by way of the interexchange carrier network 107.

The illustrated telecommunications system is also operational, however, for what is now rather conventional advanced intelligent network (AIN) call processing. For that, the central office switches 117 and 119 of LEC 105 are each operational as service switching points (SSPs) which, for AIN processing, simply means that these switches are each set up to detect call processing triggers that invoke intelligent network call processing services. An integrated service control point (LEC ISCP) 131 and elements of a common channel signaling system within LEC 105 support the AIN operations that are carried out within the LEC. The elements of the signaling system of immediate interest are the LEC signal transfer point (STP) 132 and connecting data links 133–135. Data links 133 and 134 connect the LEC STP to switches 117 and 119, respectively; data link 135 connects the LEC STP 132 to the LEC ISCP 131. The STP 132 is a node within the signaling network to facilitate the transfer of signaling messages within the signaling system. As will be more fully discussed below, additional data links 136 and 138 run from STP 131 into the CPE 101 and into the IXC 107, respectively.

The network ISCPs 131, 142 preferably are integrated systems. In such an implementation, an ISCP includes a Service Management System (SMS), a Data and Reporting System (DRS) and a Service Control Point (SCP) database system running Multi-Services Application Platform (MSAP) software. The ISCP also typically includes a terminal subsystem referred to as a Service Creation Environment or SCE, for programming the database in the SCP for the services subscribed to by each individual customer. The components of such an ISCP are interconnected by an internal, high-speed data network, such as a token ring network. Rather than operating full ISCP's of the type described, a number of local and interexchange carriers operate simpler systems serving only as SCPs.

The AIN operating principle is reviewed briefly below with particular emphasis on one exemplary call processing routine.

The path and processing of an AIN call from telephone 111 for the POTS call discussed above, initially goes through the PBX 113 to the central office switch 117 of LEC 105. Thus, whether the call is an AIN call or not, it is handled the same within the CPE 101. Any conventional AIN treatment the call is to receive only begins once the call enters the network (generally herein, except as will be clear from the context, "the network" may be considered to include any part of the telecommunications system beyond the CPE whose operations are being considered).

During call processing, the SSP capable switch 117 is able to detect a trigger (e.g., as from the dialed digits) indicating that the call requires additional information or instructions for completing the call processing. For example, if the call is an 800 call requiring the services of an interexchange carrier, the switch 117 will detect that trigger event from the dialed digits. In response, the switch 117 momentarily halts its processing of the call so that a determination can be made as to which one of the various interexchange carriers this particular call is to be handed off to (for simplicity, only one IXC network is illustrated). To do that, the switch 117 will launch a query message via the data link 133, through the STP 132, and the data link 135 to the LEC ISCP 131.

The query message gives the ISCP 131 information about the call and asks for directions in return as to which IXC to forward the call to. The ISCP 131 performs suitable logic operations and provides the identity of the carrier in a response message that is returned to the SSP 117 by way of the same data path. With the carrier identified, the SSP switch 117 resumes processing of the call. In the present 800 number example, the switch 117 passes the call to the interexchange carrier network 107, which is the carrier network identified in the response message. The call is then handed off to the IXC network 107, entering through the IXC's point-of-presence (POP) 140.

The POP 140 may itself be a switch having SSP capabilities, and it is assumed for present purposes that it does. Once received, the IXC carrier may need to route the call to a particular telephone (not specifically illustrated) where the call can be responded to. Typically, for an appropriate response, the exact phone may depend on the day of the week, the time of day of the call, and the geographical area from which it originates. To do that routing, the IXC switch of POP 140 is triggered to consult an IXC integrated service control point, such as IXC ISCP 142, for routing instructions. The switch of POP 140 thus sends a query message asking for those instructions to the IXC ISCP 142 by way of data link 144, IXC STP 145, and data link 146. These elements (data link 144, IXC STP 145, and data link 146), may be considered as elements of an IXC common channel signaling system. The IXC ISCP 142 responds to the query message by determining how the call is to be routed within the IXC 107 and sends the results of that back through the signaling system to the POP 140 in a response message. The switch of POP 140 then resumes its processing, taking action to route the call accordingly.

In summary, the basic AIN operating principle involves a switching system's retrieval of information and data, usually via a common channel interoffice signaling system, from a service element separate from the switch. A switch handling a call encounters some processing condition that requires information, data, or directions in order to continue the call. A service logic provider (e.g., a database system in the form of an SCP or ISCP) is accessed; and the information, data, or directions are obtained as a result of the service logic provider's performance of a service logic program. In practice, the service logic program may perform various operations, ranging from the simple retrieval of information from a data table to the performance of a complex operation in order to derive the required information.

Voice-band information on the lines and trunks constitutes 'in-band' information. Signaling data carried on the various data links and through the STPs constitutes 'out-of-band' information. The usual network signaling system is in accordance with what is known as Signaling System 7 (SS7), and the messages are in standard TCAP format. In some cases, the service logic provider may be in the form of an "intelligent peripheral" processor accessible by an SSP equipped switch without access through the signaling system.

The present invention, operative in connection with communications between CPE and a telecommunications network, provides the CPE with access to the intelligence of an AIN and extends the AIN operation into the CPE itself. This is discussed in connection with FIG. 2.

For illustrating the invention's operation, the first CPE 101 is shown in FIG. 2 to include not only PBX 113 and telephone station 111, but to further include another PBX 148 having connected to it a second telephone station 149. This illustrates a typical arrangement of PBXs in CPE that may be set up for, say, a large business (or other) organization. The two PBXs 113 and 148 are interconnected by connecting line 150. Similar to PBX 113, the second PBX 148 has a connecting path 152 into a telephone company central office so that calls can be exchanged with entities outside the CPE 101. The other central office to which PBX 148 is connected may be the same central office switch 117 that PBX 113 is connected to or it may be a different central office altogether (not illustrated).

Within CPE 101 the PBXs 113 and 148 each have access through a CPE signaling system to a CPE ISCP 155. In the CPE, the ISCP 155 may consist of some or all of the components of the network ISCPs 131, 142 described above, particularly for a large business customer operating two or more interconnected PBXs. However, for customers having more limited communications systems, the CPE ISCP 155 can take a much simpler form. The CPE ISCP can comprise a simple PC running some form of database software to provide a CPE SCP type database functionality.

The CPE signaling system, although not separately designated in the figure, is made up of CPE STP 157, connected on one side by a data link 159 to the CPE ISCP 155, and on the other side by separate data links 160 and 161 to PBXs 113 and 148, respectively. The CPE signaling system may be in accordance with Signaling System 7, although it need not be, and it can take various forms, as will be discussed.

The CPE signaling system is compatibly interfaced through the CPE STP 157 via the data link 136 to the LEC STP 132. Since the LEC STP 132 has an interconnection 137 to a signaling system of the IXC 107, the CPE signaling system is effectively interfaced and interconnected to a "network" signaling system. It will be understood that, although the CPE signaling system is here shown to be interconnected to the network signaling system by way of the data link interconnection 136 between the CPE STP 157 and the LEC STP 132, the CPE and network signaling systems can be also be interfaced by connections through other STPs within the network signaling system. For simplicity, these other possible interconnections are not illustrated. It is the purpose of the STPs to facilitate these signaling exchanges.

At this point it will be recognized that the combination of the CPE signaling system and the CPE ISCP 155, with connections into the two PBXs 113 and 148, provides an AIN architecture within the CPE 101 similar to that discussed above for the network to which the first PBX 113 is interconnected. This recognizable architecture, very suitable for discussion purposes here, may take a number of physical forms within the CPE as will be discussed further below.

For operation in the AIN environment that is established, the two PBXs 113 and 148 are each programmed with SSP capabilities. This means that each of the PBXs 113, 114 have the ability to detect AIN triggers and to perform AIN signaling and call processing functions in response to the trigger consequences. Thus when a call is being processed in one of these SSP adapted PBXs, if an AIN trigger is detected, the PBX will suspend processing of the call and launch a query message seeking directions or a signal for further processing. The directions (information, data, etc.) may be obtained from the local CPE ISCP 155. Notably, however, the query message may be alternatively directed into the network by way of the network signaling system, for potential acceptance by a targeted one of the ISCPs that is accessible from the network signaling system.

With access to the network signaling system and, consequently, to those things that are connected thereto, the CPE 101 has a vehicle not only for obtaining information and data from network based sources, but for calling upon network elements to obtain the use of certain supporting resources available within the network. Conversely, and equally notable, the network can be given access through the interconnected signaling systems to the information, data, and other supporting resources of the CPE 101. Again, for present purposes and for developing an understanding of the invention, the "network" is considered to be the entire network beyond the CPE whose operation is being considered, the elements of which are accessible by the network signaling system.

Generically, a call being processed within, say, PBX 113, either as an incoming call or as an outgoing call, may result in the occurrence of a trigger whenever a certain preprogrammed condition is encountered in the call processing. The PBX 113, as a call control means, recognizes the need for further information, data, or directions in order to continue the processing. The PBX 113 therefore launches a query message, through the data link 160 to be received initially at the CPE STP 157. The PBX 113 may direct the query message to the CPE ISCP 155, or the PBX may direct the query into the network for access to whatever is needed from one of the ISCPs accessible via the network signaling system (e.g., LEC ISCP 131). The CPE STP 157 directs the query message accordingly.

Once the query message is received by the appropriate service providing ISCP, a service logic program appropriate to the query is performed by the ISCP, and the results of that logic program are put into a response message. The response message is returned to the PBX 113 by way of the CPE and network signaling systems, interfaced to each other through the CPE STP 157. Upon receipt of the response message, the call processing is continued in the PBX 113.

For the same call, another triggering event might occur in, for example, the SSP switch 117. In that case, the switch 117 also launches a query message. However, in accord with the invention, the LEC switch 117 may launch the query to the CPE ISCP 155, as an alternative to the LEC ISCP 131 and the other network based ISCPs in the above-discussed 800 number example. That query message travels via the interfaced signaling systems, through the CPE STP 157. For an appropriate query message received from the network, the CPE ISCP 155 is also operative to carry out a logic program and to formulate the results thereof into a response message. That response message is returned to the switch 117 to initiate continued processing.

It is noteworthy that a response message from an ISCP (i.e., from one of the logic service providers) does not necessarily have to be directed to the call control means (e.g., switch 117 or PBX 113) that requested it, but the response message can be directed to other elements accessible by the interconnected signaling systems. That capability gives even more flexibility to the invention's operation.

Figure 3:
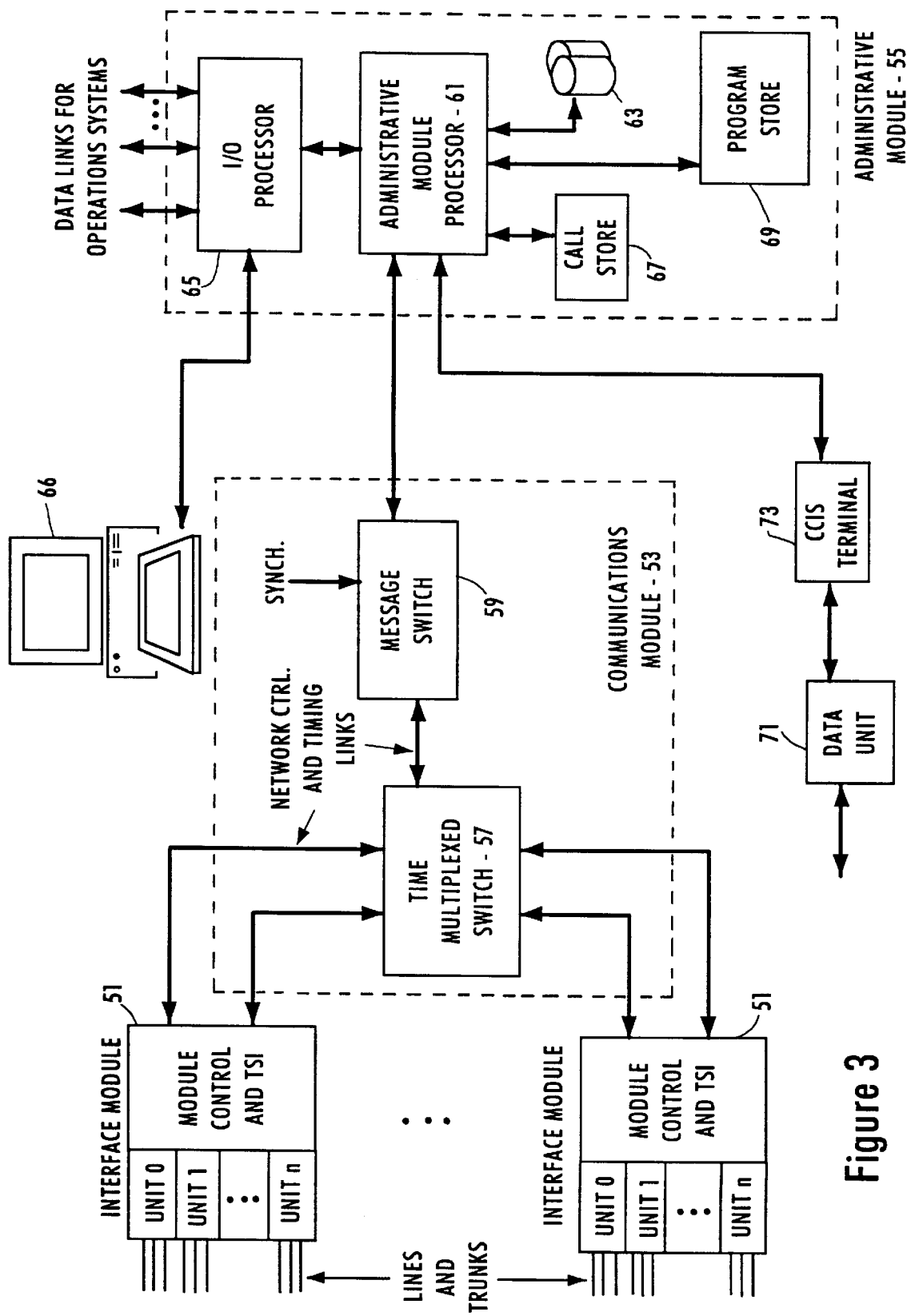
FIG. 3 is a more detailed diagram of one of the SSP type central offices.

FIG. 3 is a simplified block diagram of an electronic program controlled switch which may be used as any one of the SSP type CO's. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see FIG. 1), for facilitating call processing signal communications with other CO's and with the ISCP 40.

As illustrated in FIG. 3, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

A central office switching system or CO normally responds to a service request on a local communication line connected thereto, for example an off-hook followed by dialed digit information, to selectively connect the requesting line to another selected local communication line. The connection can be made locally through only the connected central office switching system. For example, for a call from station A to station B in FIG. 1, the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks (and tandem offices if necessary) interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signalling (through the voice channel), the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between stations. In an AIN type network, these normal call processing routines would still be executed for completion of calls not requiring AIN processing or service features.

In accord with one aspect of the present invention, the 'look-ahead-busy-' functionality of the CCIS type call processing method is extended into the CPE 101. This functionality applies both to outgoing calls from CPE stations and to incoming calls directed to CPE station.

Consider first the example wherein a person using telephone 111 initiates a call to telephone 127 (FIG. 2). The CPE PBX 113 detects the off-hook condition of telephone 111 and collects the dialed digits. The CPE PBX 113 suspends the call and sends a query message identifying destination station 127 through data link 160, CPE STP 157, data link 136, LEC STP 132 and data link 134 to the central office 119 to which the called station 127 is connected. The terminating central office 119 determines whether or not the called station 127 is busy. If the called station 127 is busy, the terminating central office 119 so informs the CPE PBX 113 by sending an appropriate message back through the STP's and data links. The PBX 113 in turn provides a busy signal to the calling station 111. No voice channel connection to the LEC network 105 via trunk 103 is ever established. If the called station 127 is not busy, the terminating central office 119 so informs the PBX 113 by sending an appropriate message back through the STP's and data links. A telephone connection is then constructed via the PBX 113, the trunk 103, the central office 117 (acting as a tandem), the trunk 121 and the terminating central office 119 between the calling station 111 and the called station 127. The terminating central office 119 then provides a ringing signal to the called station 127 and sends ringback tone back through the voice connection to the calling station 111.

Consider now the incoming call example wherein a person using telephone 127 initiates a call to CPE telephone station 111. The central office 119 detects the off-hook condition of telephone 127 and collects the dialed digits. The central office 127 suspends the call and sends a query message identifying destination station 111 through data link 134, LEC STP 132, data link 136, CPE STP 157 and data link 160 to the PBX 113 to which the called station 111 is connected. The terminating PBX 113 determines whether or not the called station 111 is busy. If the called station 111 is busy, the PBX 113 so informs the originating central office 119 by sending an appropriate message back through the STP's and data links. The central office 119 in turn provides a busy signal to the calling station 111. No voice channel connection to through the LEC network 105 to the CPE 101 is ever established. If the called station 111 is not busy, the PBX 113 so informs the originating central office 119 by sending an appropriate message back through the STP's and data links. A telephone connection is then constructed via the central office 119, the trunk 121, the central office 117 (acting as a tandem), the trunk 103 and the PBX 113 between the calling station 127 and the called station 111. The PBX 113 provides a ringing signal to the called station 111 and sends ringback tone back through the voice connection to the calling station 127.

In an Advanced Intelligent Network (AIN) type system, such as shown in FIGS. 1 and 2, certain calls receive specialized AIN type processing, e.g., under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches in the public and CPE networks can recognize a variety of events as triggers for activating a query and response type AIN interaction with the ISCPs. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by an intelligent peripheral (IP) platform, such as IP 163 in FIG. 2, the call control message would instruct the SSP to route the call to the associated peripheral platform.

In the network of FIG. 1, the ISCP 40 transmits a "SEND to RESOURCE" type TCAP message instructing an SSP, such as SSP 17, to access a resource and collect digits. This message identifies a particular resource, in this case an ISDN type voice channel to an associated peripheral announcement platform. Each time the ISCP sends such a "SEND to RESOURCE" message to an SSP, the ISCP concurrently sends a message through the X.25 data link to the associated intelligent peripheral platform. This message tells the platform what message to play on the specified ISDN channel at that time. If the platform has a text-to-speech converter, the announcement could take the form of virtually any desired script.

As has been mentioned, it is a feature of the invention that resources can be shared between the CPE and the network. For that, the processing is not altogether different from what has just been described. In that case, the triggering event that occurs is a recognition, say, in the PBX 113 or switch 117, that some particular supporting resource is required in order for the call processing to continue. Among the things that might be considered as supporting resources are voice recognition units, conference bridges, announcement devices, and so forth. This is in contrast, for example, to the case wherein the call control means (PBX or switch) requires routing or control information in order to continue the processing.

If supporting resources are needed, as in any other case, the call control means is still triggered to launch a query message to the appropriate logic service provider (the appropriate ISCP), requesting that the needed support resources be provided. Also as in any other case, the logic service provider goes through a program of operation to determine the desired results. In the resource sharing situation, rather than coming up with routing or control information, the logic service provider produces results to cause the support resource to be made available (assuming there is not some total exhaustion of resources). The response message in that case may take a couple of forms, depending on the query message and the particulars of the logic service program performed by the ISCP. For one, the responding ISCP may send a response message to the network or to the CPE, as appropriate, directing that the needed resource be put into place, and send another response message to the switch or the PBX, as appropriate, advising, in effect, that the required support resource has been put into place and that call processing can therefore be continued. Alternatively, the responding ISCP may be programmed to return a response message that simply provides the PBX or switch (i.e., the call control means) with directions for obtaining connections to the support resource. The steps for making that connection are then carried out by the receiving call control means.

To more concretely illustrate the invention's operation, consider the relatively simple processing that might be needed for a call originating at telephone station 111 and dialed for placement to an international destination. It is assumed for that case that authorization to make international calls from station 111 must be established before the call is allowed, and that an attempt to place an international call if the station is not so authorized will provoke an automatic announcement advising the caller accordingly.

Initially, from the dialed digits received by the PBX 113 from the telephone 111, it is recognized that the call is an international call and that the authority for international calls to be placed from telephone 111 has to be determined in order for the call processing to continue. Those are the trigger conditions that provoke a query message to be formulated asking for a determination as to whether international calls can be made from station 111.

If an answer is required for any international call without regard to destination or other factors, it may be most convenient to program the system so that the answer is obtained from the CPE ISCP 155. On the other hand, if calls are to be approved on a country by country basis and perhaps with some other added qualifications (e.g., approved as a function of the time of day), then the CPE ISCP 155 may be inadequate. Under these later circumstances, it may be necessary to make use of the network intelligence, so that the operation for obtaining the answer is programmed into, for example, the LEC ISCP 131. In either case, the query message will contain enough information for the determination to be made. In the first case the query message is via data link 160 and the CPE STP 157 to the CPE ISCP 155 by data link 159. In the second case, the message is directed by the CPE STP 157 over the data link 136 to the LEC STP 132, and from there via data link 135 to the LEC ISCP 131.

The response message, containing the approval/disapproval answer is returned by the path taken by the query message. If the call is approved, the PBX 113 continues processing of the call toward completion. On the other hand, if the call is not approved, the processing resumes, but for the purpose of announcing to the caller that at least the international call of the moment cannot be completed.

The call processing that follows call denial illustrates the resource sharing aspect of the invention. For an announcement to be made telling the caller that the call cannot be made, the PBX 113 must obtain an announcement unit and connect it into the line to the calling station 111. The announcement unit may be an element of the Intelligent Peripheral 163 or a separate unit not specifically illustrated. For this, the PBX 113 may be triggered merely by the fact that an announcement is required or it may be triggered when it seeks a unit, otherwise normally available, and finds that the need cannot be fulfilled. The exact trigger will depend on the programming for that aspect of operation within the PBX 113. Once a trigger occurs, however, the PBX 113 will again formulate and send a query message asking, in effect, for the required resources to complete processing of the call. The query message may be directed to the CPE ISCP 155 or to a service logic provider accessible by the network signaling system (such as LEC ISCP 131). Which service logic provider is queried (at least initially) depends on the logic programmed into the operation of the PBX 113. For a rather simple operation of this kind, the CPE Switch would probably be first looked to. In either case, the receiving service logic provider runs the appropriate logic program and provides the results in at least one response message.

The result here could be, for example, that the required announcement unit is obtainable by appropriate connections from the PBX 113 to an announcement unit to be found in the second PBX 148 within the same CPE 101. Alternatively, however, the results might be such as to point to an announcement unit available at the local exchange carrier's switch 117, for example. For this kind of resource sharing, the response messaging may take either of two forms as was mentioned above. In this case, since the PBX is not already connected into the call, it will be preferable in most cases for the responding ISCP to simply provide directions in its response message that will enable the PBX 113 to make connections to the announcement unit in the second PBX 148. By contrast, were the call already connected into the switch 117 in some other call processing mode, for example, it would be preferable to send directions directly to the switch 117 for connecting the certain resource into the call. In the latter case, a response message is also sent back to the PBX 113 from the responding ISCP to confirm that the resource has been summoned and to signal to the PBX 113 to continue its processing. The result, in the example at hand, is to cause the announcement to be played to the caller, and the call to be processed to conclusion.

It will be recognized that more than one trigger may occur for a call being processed, and that the process will therefore be iterative or cyclical in some cases so that the steps outlined in these examples, and in the general case, may be repeated as needed for the call being handled. It will also be recognized that if support resources are requested from a first potential source (as from the second PBX 148 in the example just discussed) and if it turns out that those resources are not available, then they may be sought from other potential sources accessible via the interconnected signaling systems.

The arrangement described, permitting intelligence and resources to be shared between CPE and the network with which it interacts, and permitting better coordination and integration of operations, provides a basis for numerous advanced telecommunications applications. Those of skill in the art will readily recognize this, and various specific uses will be apparent to them. Thus, although a discussion of the full range of possible applications is not needed, to further describe the invention, and to illustrate the flexibility and versatility that it offers, a few other applications of it are nevertheless briefly described.

In FIG. 2, for example, there may be a need or desire to provide speech recognition capabilities in connection with the operation of the PBX 113 that is part of the CPE 101. Ordinarily, PBXs are without these capabilities, but they are becoming rather common in the networks of local exchange carriers. Here the PBX 113 is given the ability to reach into the network and plug the required speech recognition capability into a PBX call processing routine. In this case, the central office switch 117 has access to an intelligent peripheral (IP) 163 which does have the ability to do voice recognition (e.g., to interpret spoken words). To gain these speech recognition capabilities for a call handled by the PBX 113, the PBX is triggered in its call handling to make a request for connection of the IP 163 into the call, at least during any time period when speech recognition capabilities are desired. For that, the PBX 113 sends a request (query) message, per its programming, to either the CPE ISCP 155 or to the LEC ISCP 131 and asks for an assignment of the IP 163 to the call.

Since the IP 163 is within the LEC network 105 and principally subject to that network's control, it is preferable that the request message be handled by the LEC ISCP 131. But, notably, that need not be the case. Either way, the cognizant ISCP can respond by either sending a response message to the switch 117 directing it to make the connections of the IP 163 into the PBX 113 (and with confirmation from the ISCP to the PBX 113), or the ISCP can send a response message to the PBX 113 with directions for it to make connections into the switch 117 and to the IP 163. As was noted above, depending on the combined capabilities of the switch 117 and the PBX 113, the process may require more than a single trigger event in the PBX 113, and it may also require some repetition of the processing steps. Once the IP 163 is connected into the call and the PBX is made aware of the results of its request, the call processing continues.

To further illustrate by example, the invention can facilitate conference calling in the event the PBX 113 by itself cannot provide that feature, either because it has already exhausted its conferencing resources or because it is without such resources in the first place. When a conference call is being set up in the PBX 113, a lack of an available conference bridge for bringing the conferees' lines together will be recognized by the PBX (the relevant call control means in this example) as a trigger that this resource is needed to further the processing of the call. The PBX 113 will, according to its programmed operation, send a query message to the CPE ISCP 155. This query, in effect, asks that a determination be made for furnishing directions for connecting an available conference bridge into the call that is being set up. The query message is appropriately coded to indicate what is needed. Alternatively, as is now clear, the operation may be arranged such that some logic service provider other than the CPE ISCP 155 (e.g., such as LEC ISCP 131) be consulted for the required directions.

Assuming the determination is to be made by CPE ISCP 155, upon receipt of the query message, that ISCP carries out the particular logic service program that is invoked by the query message and provides the results in a response message. The initial results could refer the PBX 113 to the second, interconnected PBX 148 in the CPE 101 for the needed conference bridge, with directions for interconnecting thereto. Alternatively, the results could refer PBX 113 to a conference bridge accessible in the network for use in setting up the call (say, from the switch 117 in the LEC 105), also with connection directions.

It will be noted that, should the supporting resource sought (here, a conference bridge) not be available in the facility to which the PBX 113 is directed, then the process can operate iteratively to determine alternative facilities for providing the needed resource. That is, for example, should the required conference bridge not be available within the second PBX 148, the first PBX 113 can be re-triggered to again query the appropriate logic service provider (ISCP) for directions to an alternative facility where a conference bridge can be accessed for the call. The messaging capabilities inherent in the invention provide for this, and the implementation is a matter of suitable programming by reasonably skilled programmers.

With a slightly different character to its operation, the invention also has the ability to provide a "work at home" subscriber with telephone services that have the same characteristics as those available at the subscribers place of business. Although a CPE structure that is more likely to be applied in a residential setting is discussed below in connection with FIG. 5, for ease of explanation, reference to FIG. 3 will continue. Operationally, for work at home, a first trigger occurs when a calling feature is invoked. As an example, the subscriber may have a speed dialing feature in his office which is also to be provided in the work at home setting. It will be recalled that speed dialing allows a caller to make a call by dialing as little as a single digit. A speed dialing input, for example from telephone 111, will be detected as an AIN trigger by a call controller, which, as far as the invention is concerned and for explanation purposes, is equivalent to PBX 113. The call controller (i.e., PBX 113), by way of the interconnected signaling systems, sends its query message to the LEC ISCP 131. The query message includes indications of the caller's speed dial digital entry and the identity of telephone station 111, along with an indication that a speed dialing request is to be serviced, and other indicia as required. The LEC ISCP 131 translates the speed dial digital entry into a directory telephone number. That number is returned to the call control means in a network response message, providing information for call placement and routing.

As an added feature, however, the programming of the LEC ISCP 131 may be such that the directory number is sent, not to the home-based call controller, but to the central office switch (e.g., switch 117) of the local exchange carrier that ultimately handles the call anyway. That kind of arrangement gains efficiency and saves time in the call set-up process. Other features of the subscriber's office telephone services may similarly be called forth by accessing the intelligence of the advanced network in the manner facilitated by the invention.

As noted above, the network can access the logic in the CPE ISCP 155. Consider now a 'work at home' example wherein the location corresponds to telephone 123 serviced by the LEC system 105, and the CPE ISCP 155 stores the call processing records for the customer's normal business telephone service. When the subscriber activates telephone 123 to obtain the business service, e.g. the business related speed dialing feature, the LEC switch 117 detects this event as an AIN trigger. The call controller (now switch 117) sends its query message to the CPE ISCP 155. The query message includes indications of the caller's speed dial digital entry, the identity of telephone station 123, an indication that a speed dialing request is to be serviced, and any other indicia required. The CPE ISCP 155 translates the speed dial digital entry into a directory telephone number and returns that number in a call control message to the switch 117 serving as the call control means. In response, the switch 117 proceeds with call completion in the normal manner.

Again as an added feature, the programming of the ISCP (now ISCP 155) may cause transmission of the directory number, not just to the home-based call controller, but to the call controller that will ultimately handle the call. In the present example, the directory number from the speed dial feature may correspond to another of the telephones of the business customer served by CPE system 101, e.g to telephone 149. The ISCP 155 therefore would provide an instruction to the PBX 148 to complete the call.

Although shown in FIG. 2 as telephones and described as such above, the various terminal devices can comprise any communication device compatible with the respective telecommunication line. Where the line is a standard voice grade telephone line, for example, the terminals could alternatively include facsimile devices, modems etc. Also, the illustrated links to the individual terminal devices may comprise lines, as shown, or wireless communication links.

Figure 4:
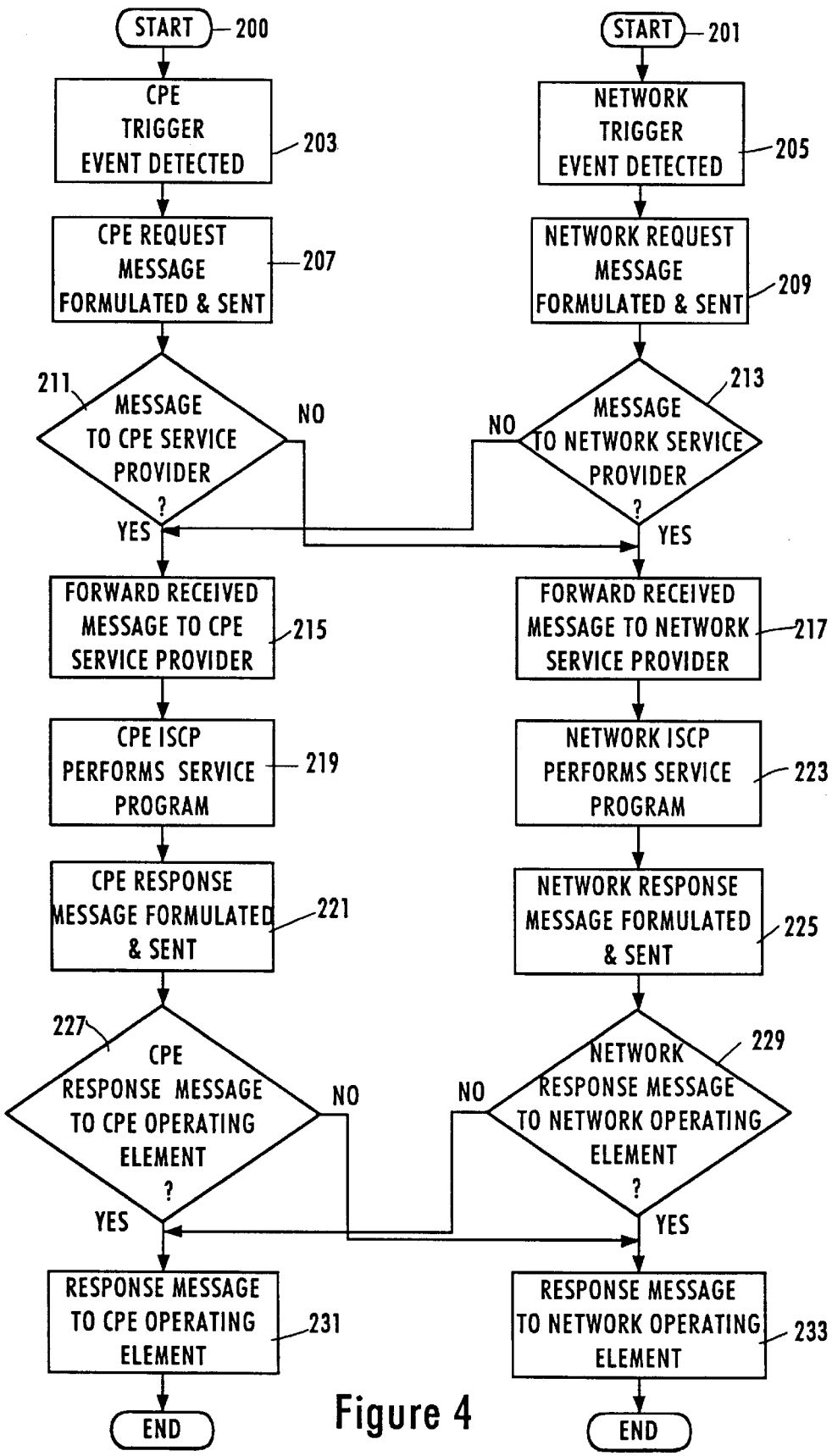
FIG. 4 is a simplified block flow chart illustrating call processing carried out in accordance with a preferred embodiment of the present invention.

The flow chart of FIG. 4, taken in connection with FIG. 2, very generally summarizes certain important operations that take place as these various features and services are implemented by the invention. Because the process may be independently initiated either from within the CPE or from within the network, there are two potential starting points for the operation, indicated as starting points 200 and 201, respectively. The processing subsequently becomes intertwined.

In either case, a trigger event initiates the operation. A CPE trigger event will be detected in step 203 and a network trigger event will be detected in step 205. As was discussed above, both generally and in connection with certain of the operating examples, the trigger event and its detection will typically take place within a call control means which is carrying out at least some part of the telecommunications. Within the CPE, an example of a call control means is the PBX 113; within the network, an example is the SSP adapted switch 117. The trigger event itself relates to a processing condition for which a supporting action, including the determination of information, is required for the processing to continue. This includes the need for auxiliary, or shared, resources in order to process the telecommunications being handled. When there is a trigger condition calling for resources of some kind, the information sought by the call control means is either an indication that the resource called for has been provided (as being connected into a call, for example) or directions for making connections to the needed resource.

Once a trigger condition is detected by either the CPE call control means or the network call control means (or both), depending on which one has been triggered, that call control means momentarily suspends its processing of the telecommunications call being handled and formulates a request (or query) message by which the information or data required for furtherance of the processing is sought. Step 207 provides for the CPE call control means to formulate and send out a CPE request message if it is triggered. Step 209 provides for the network call control means to formulate and send out a network request message if it is triggered. From whichever control means it arises, the message is directed to an appropriate logic service provider, such as either one of CPE ISCP 155 or LEC ISCP 131 and the message is addressed accordingly.

The network signaling system and the CPE signaling system interface to each other to facilitate the cross-routing via signal transfer points (e.g., STPs 132 and 157 of FIG. 2). Consequently, a CPE request message can be directed to either a logic service provider within the CPE or within the network, and similarly, a network request message can be directed to a logic service provider either in the CPE or in the network. Operationally, the cross-directing of request messages is reflected, first, in decision block 211 where, effectively, it is determined whether a CPE request message will be directed to the CPE ISCP 155 or to the LEC ISCP 131, and, second, in decision block 213 where it is determined whether a network request message will be directed to the CPE ISCP 155 or to the LEC ISCP 131.

The signal transfer points through which the network signaling system and the CPE signaling system are interfaced can receive request messages regardless of origin, whether in the CPE or in the network. Thus, step 215 allows for the receipt of both CPE request messages and network request messages and for each received request message to be forwarded to the CPE service logic provider CPE ISCP 155. Similarly, step 217 allows for the receipt of both network and CPE request messages and for each received request message to be forwarded to the network logic service provider, which, in this case is LEC ISCP 131.

Within the CPE, at step 219, the CPE ISCP 155 carries out the service logic program that is provoked by the received request message. The CPE ISCP 155 thereby comes up with information elicited by the request message, which is either call control information (which may be call routing information) or directions for setting up a needed auxiliary support resource. A CPE response message containing the information is formulated and put out to the CPE signaling system at step 221. If the directions for setting up an auxiliary resource are directed to other than the requesting call control means, another response message may be sent to that call control means to inform it that the requested resource has been called for (that step is not specifically shown) and that call processing can be resumed until another trigger is detected (which may occur, for example, if the need for a resource remains unmet). To the same effect, within the network, at step 223, the LEC ISCP 131 carries out a logic service program in response to any request message it may receive, producing the same kind of information. One or more network response messages containing that information are formulated and sent out on the network signaling system at step 225.

As with request messages, response messages can be cross-routed by virtue of the interfaced signaling systems. A CPE response message can be directed to an operating component addressable either within the CPE or within the network. Similarly, a network response message can be directed to an operative element addressable either in the CPE or in the network. In most cases, a response message will be directed to a call control means so that its call processing operations can continue. That is not the case for every response message, however, since some response messages may be directed to operative elements as needed to implement the sharing of resources as has been described. Operationally, this cross-routing is reflected, first, in decision block 227 where, effectively, it is determined whether a CPE response message will be directed to an element of the CPE 101 or to an element of the LEC 105, and, second, in decision block 229 where it is determined whether a network response message will be directed to an element of the CPE 101 or to an element of the network.

Thus, step 231 allows for the receipt of both CPE response messages and network response messages and for each received request message to be forwarded to an element of the CPE. Similarly, step 233 allows for the receipt of both network and CPE request messages and for each received request message to be forwarded to an element of the network. If the receiving element is a call control means awaiting the information contained in the response message, then it uses the information content to cause its call processing operations to continue.

Figure 5:
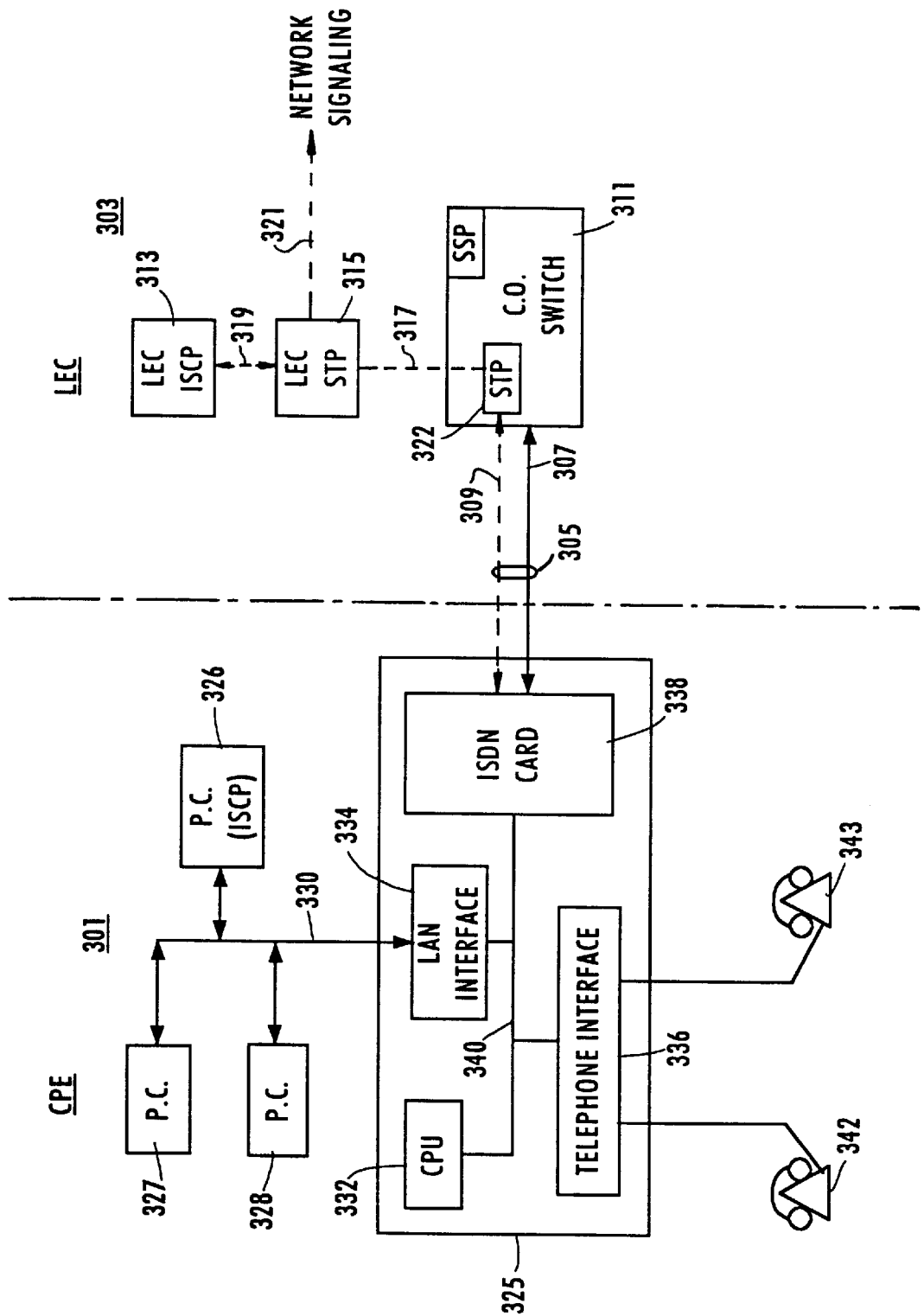
FIG. 5 is a block diagram showing a preferred embodiment of the invention that might be employed in a residential CPE operation.

The CPE arrangement illustrated in FIG. 2 is representative of what might prevail in a commercial or other sizable telecommunications setting. It is presently unlikely that residential, or in-home, CPE would include PBXs and signaling systems in accordance with Signaling System 7. FIG. 5 is illustrative of a more typical residential CPE arrangement for the invention.

The residential CPE 301 illustrated in FIG. 5 interconnects to a local exchange carrier network (LEC 303) by an ISDN (Integrated Service Digital Network) connection 305 (or, generally, a voice over data connection). Accordingly, the connection 305 includes at least one standard B-channel 307 (bearer) and a D-channel 309 (data). The D-channel provides out-of-band signaling capabilities between the CPE and the LEC.

On the LEC side, the ISDN connection 305 is into a central office switch 311 which is adapted for AIN operation as an SSP. The LEC 303 also includes an ISCP 313 interconnected by a LEC signaling system to the switch 311. The LEC signaling system includes an STP 315, interconnected on one side by data link 317 to the switch 311, and on the other side by data link 319 to the ISCP 313. The LEC STP 315 also has connections 321 into other signaling system elements (not illustrated) comprising, overall, a network signaling system. Within the switch 311, the out-of-band-signaling link 309 is interconnected into the LEC signaling system by a signal transfer point (STP) 322. As will become clear, the LEC signaling system is interfaced to the residential CPE signaling system (to be discussed).

The CPE 301 is configured as a group of personal computers (PCs) (or other devices, such as video terminals, etc.), including a first PC 325, and other PCs 326–328, interconnected to each other in a local area network (LAN) arrangement. The PCs 325–328 are communicably tied together by LAN bus 330.

The first PC 325 is arranged to connect directly to the ISDN connection 305 as well as to the LAN bus 330. Internally, the PC 325 includes a central processor (CPU) 332, a LAN interface circuit 334, a telephone interface circuit 336, and a standard ISDN interface circuit card 338. These various units are interconnected together and are communicable through an internal system bus 340. Although not shown, it will be understood that the PC 325 also includes memory and other standard operating components. The CPU 332 generally controls overall operation in accordance with a stored program of operation, taking input and output signals into account in the operation.

The ISDN card 338 provides an interface for compatibly connecting the PC 325 to the ISDN connection 305 and thus to the telephone office switch 311. Interfacing connections such as those provided by the ISDN card 338 are well understood and cards suitable for such use are readily available commercially from a number of sources. The telephone interface card 336 permits telephones, such as phones 342 and 343, to connect into the PC 325, and to communicate through the LEC 303 via the ISDN card 338 and the connection 305.

The LAN interface 334 connects the PC 325 into the LAN bus 330 to facilitate communications within the local area network. The LAN bus 330 may operate in accordance with any number of known protocols suitable for residential use. Physically, the LAN bus 330 may be a coax cable, a twisted pair of wires, etc. The PC 325 can communicate through the LEC 303 via the ISDN card 338 and the connection 305. The other PC's can communicate through the LEC 303 via the LAN interface 334, internal bus 340, the ISDN card 338 and the connection 305. One of the PCs connected into the LAN bus, PC 326 for example, may be configured to function as a logic service provider (an ISCP) as has been described above in connection with the other figures.

The LAN bus 330, the LAN interface 334, the PC bus 340, and the ISDN interface card 338 provide a signaling system within the CPE 301. This CPE signaling system is interconnected or interfaced to the LEC signaling system by the out-of-band D-channel signaling link 309 and the signal transfer connection 322 within the switch 311.

Operation is analogous to what has been described above in connection with FIGS. 2 and 4. For example, to process a telephone call originating at telephone 342, the CPU 332 will cause operations internal to the PC 325 to be conducted which are directed at furthering the call. In that sense the CPU serves the purpose of a CPE call control means. The programming is such that a trigger condition, in the manner discussed above, will cause the CPU 332 to launch a query for information or support in order to continue the call. A trigger may occur, for example, because routing information is needed in furtherance of the call. In that event, the CPU 332 will cause a request message to be formulated for eliciting that information.

By the connections established and the interfaced signaling systems, the information needed may be sought either from the LEC ISCP 313 or from the logic service provider PC 326. If the routing information is relatively simple (e.g., a speed dialing number), the preference is that the information be obtained from the PC 326. By a suitably formulated request message, the CPU 332 addresses the PC 326, via the LAN interface 334 and the LAN bus 330. The PC 326 performs a program to look up the routing information and to cause it to be returned in a response message to the PC 325. With the routing information in hand, the CPU 332 continues the call processing.

It may occur later in processing the same call, however, that support resources are needed for some other aspect of the call. For example, it may develop that conference calling capabilities are needed which cannot be met from within the CPE 301. In that event, the CPU will again be triggered to seek the use of supporting resources for setting up that part of the call. A conference bridge may be needed, for example. For that, the CPE 301 may call upon the supporting resources of the LEC network 303. Upon the trigger that results, the CPU 332 will formulate and send a CPE request message, for example, to the LEC ISCP 313 seeking to have a conference bridge set up in the LEC switch 311. The message is sent by way of the signaling interface through the ISDN interface card 338, the D-channel data link 305, the switch-based STP 322, and up to the ISCP 313 through the STP 315. In response, the LEC ISCP 313 performs its program of operation, determines that a conference bridge can be expected to be available at the LEC switch 311 and then forwards a response message to the switch 311 with directions for connecting the requested conference bridge (not illustrated) into the call that originated from the telephone 342. If further processing is required in the PC 325, a response signal may be forwarded to it in furtherance of its processing.

Just as the CPE call control means may have access to the LEC ISCP 313 and other service logic providers and intelligent peripherals accessible from the LEC signaling system, a network call control means may have access to information and data from sources within the CPE 301, such as the ISCP running on PC 326, the other Pcs 327 and 328 and other devices connected into the LAN bus 330. It will be understood that, although the CPE 301 is depicted as being made up of separate and distinct components, it is within the scope of the invention to encompass all, or virtually all, of the operating elements of the CPE in a single unit or within a single computer.

In accord with another aspect of the present invention, the AIN network control functionalities, particularly the customer program records in the various ISCPs 155, 131, 142 and triggers in the various switches, can all be set up and modified by the customer using terminal equipment and software on the customer premises. Once an AIN service feature is defined to the customer's satisfaction, the relevant instructions and program data is transferred from the CPE 101 or 301 to the elements of the exchange carriers' networks via the signaling link and the interoffice signal network of the exchange carriers' networks. The subscriber need not call or interact with an exchange carrier technician and have the technician input the relevant service information.

In accord with this aspect of the present invention, a PC or other computer on the customer premises will run telephone service programming software, such as that used by SPACE terminals and/or disclosed in the above discussed Babson et al. Patent. In the network of FIG. 2, this computer preferably is the same computer or is connected to the computer serving as the CPE ISCP 155. In the network of FIG. 5, the computer running this software could be any one or more of the PCs 326, 327, 328. In either case, the computer running this software would include a standard keyboard and display (not illustrated). To the user, the graphical interface for defining and modifying telephone services would essentially correspond to that disclosed by Babson et al. The critical feature here is that the signaling communication link to the CCIS network of the exchange carriers permits the subscriber using the on-premises computer and software to load AIN service information into the relevant CPE devices as well as into the ISCPs and switches of the local exchange carrier network and the interexchange carrier network.

Consider the network of FIG. 2 as an example. Assume now that the computer containing the CPE ISCP related information also runs the service programming software. The user operates the computer to define a new service, such as the above discussed 'work at home' example wherein the location corresponds to telephone 123 serviced by the LEC system 105, and the CPE ISCP 155 stores the call processing records for the customer's normal business telephone service. When the user has defined the service, the relevant data records are established in the CPE ISCP 155, e.g. to identify the telephone features such as call transfer and extension number dialing that are to be available on the work at home line. The computer on the customer premises also sends messages through the STP 157 and the data link 136 to provide necessary programming information to the relevant exchange carrier components. These instructions may establish or modify call processing records in the ISCPs 131, 142 or set triggers in the relevant switching offices. In the present example, the instructions from the CPE 101 would go through the STP 132 and the data link 134 and instruct the central office 119 to detect some specified event on the line 129 as a trigger. For example, the trigger might be off-hook followed by dialing of a specified set of digits (e.g. *65) to activate the work at home feature. The instruction to the central office 119 would also identify the CPE ISCP 155 as the destination for any query messages that the central office 119 launches in response to this particular trigger event on the line 129. For appropriate service features, the service programming operation may result in similar instructions setting triggers in the CPE switching components (e.g. PBXs 148 and 113 in Figure), in the LEC network switching offices or in the IXC network switching offices.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A telecommunications network with customer premise equipment deployed to exchange telecommunications calls with a public switched telephone network having a common channel signaling system and an integrated services control point operative to perform network service logic programs to facilitate the provision of telecommunications services, said network comprising:

a programmable database within the customer premises equipment for controlling communications between said customer premises equipment and the public switched telephone network, storing service logic programs and providing results from the performance of any one of said service logic programs in a response signal;

call control circuitry for processing the telecommunications calls within the customer premises equipment, detecting at least one processing condition that requires performance of one of said service logic programs in order to continue processing for the call, and generating a request signal calling for performance of said service logic programs;

a customer signaling system by which signals are conveyed within the customer premises equipment; and a signaling interface for providing a connection between the customer signaling system and the signaling system of the public switched telephone network whereby control signals for coordinating and integrating operations are transmitted between said customer premises equipment and the public switched telephone network;

said signaling information exchanged over the signaling interface providing for a look ahead busy determination between the customer premises equipment and the public switched telephone network, including inquiring via said common channel signaling system whether a called terminal device in the customer premises equipment is busy, the public switched telephone network connecting the voice portion of the call to the customer premises equipment only upon learning that the called terminal device is not busy.

2. A telecommunications network with customer premise equipment deployed to exchange telecommunications calls with a public switched telephone network having a common channel signaling system and an integrated services control point operative to perform network service logic programs to facilitate the provision of telecommunications services, said network comprising:

a programmable database within the customer premises equipment for controlling communications between said customer premises equipment and the public switched telephone network, storing service logic programs and providing results from the performance of any one of said service logic programs in a response signal;

call control circuitry for processing the telecommunications calls within the customer premises equipment, detecting at least one processing condition that requires performance of one of said service logic programs in order to continue processing for the call, and generating a request signal calling for performance of said service logic programs;

a customer signaling system by which signals are conveyed within the customer premises equipment; and a signaling interface for providing a connection between the customer signaling system and the signaling system of the public switched telephone network whereby control signals for coordinating and integrating operations are transmitted between said customer premises equipment and the public switched telephone network;

said signaling information exchanged over the signaling interface providing for a look ahead busy determination between the customer premises equipment and the public switched telephone network, including inquiring via said common channel signaling system whether a called terminal device in the public switched telephone network is busy, said customer premises equipment connecting the voice portion of the call to the public switched telephone network only upon determination that the called terminal is not busy.

3. A method of operating a telecommunications network with customer premise equipment deployed to exchange telecommunications calls with a public switched telephone network having a common channel signaling system and an integrated services control point operative to perform network service logic programs to facilitate the provision of telecommunications services, said method comprising the steps of:

programming a database within the customer premises equipment for controlling communications between said customer premises equipment and the public switched telephone network;

storing a plurality of service logic programs in said integrated services control point and said database;

providing results from the performance of any one of said service logic programs in a response signal;

processing the telecommunications calls within the customer premises equipment;

detecting at least one processing condition that requires performance of one of said service logic programs in order to continue processing for the call;

generating a request signal calling for performance of said service logic programs;

conveying signals within the customer premises equipment over a customer signaling system; and providing a connection between the customer signaling system and the signaling system of the public switched telephone network whereby control signals for coordinating and integrating operations are transmitted between said customer premises equipment and the public switched telephone network and relate to a look ahead busy determination between the customer premises equipment and the public switched telephone network;

said look ahead busy determination being performed by inquiring via said common channel signaling system whether a called terminal device in the customer premises equipment is busy, and said public switched telephone network connecting a voice portion of the call to the customer premises equipment only upon learning that the called terminal device is not busy.

4. A method of operating a telecommunications network with customer premise equipment deployed to exchange telecommunications calls with a public switched telephone network having a common channel signaling system and an integrated services control point operative to perform network service logic programs to facilitate the provision of telecommunications services, said method comprising the steps of:

programming a database within the customer premises equipment for controlling communications between said customer premises equipment and the public switched telephone network;

storing a plurality of service logic programs in said integrated services control point and said database;

providing results from the performance of any one of said service logic programs in a response signal;

processing the telecommunications calls within the customer premises equipment;

detecting at least one processing condition that requires performance of one of said service logic programs in order to continue processing for the call;

generating a request signal calling for performance of said service logic programs;

conveying signals within the customer premises equipment over a customer signaling system; and providing a connection between the customer signaling system and the signaling system of the public switched telephone network whereby control signals for coordinating and integrating operations are transmitted between said customer premises equipment and the public switched telephone network, and relate to a look ahead busy determination between the customer premises equipment and the public switched telephone network;

said look ahead busy determination being performed by inquiring via said common channel signaling system whether a called terminal device in the public switched network is busy, and said customer premises equipment connecting a voice portion of the call to the public switched telephone network only upon learning that the called terminal device is not busy.

5. A telecommunications system comprising:

a public switched telephone network having a common channel signaling system and an integrated services control point operative to perform network service logic programs to facilitate line status monitoring, inter-node switching system circuit connections, and information exchange services and features;

a customer premises equipment installation including multiple telecommunication terminals and call control logic, storage and circuitry operative to perform customer premises equipment and network service logic programs to facilitate on premises line status monitoring, on premises inter-node switching circuit connections, and on premises information exchange services and features for processing telecommunications calls between said on premises telecommunication terminals and between said on premises telecommunication terminals and off premises telecommunications terminals connected to said public switched telephone network;

said customer premises equipment installation including a customer signaling system by which signals are conveyed within the customer premises equipment for effecting said control and information functions; and a signaling interface for providing a connection between said customer signaling system and the signaling system of said switched telephone network whereby control signals for coordinating and integrating operations between said switched telephone network and said customer premises equipment installation are transmitted therebetween.

6. A system according to claim 5 wherein said call control logic, storage and circuitry operative to perform customer premises equipment and network service logic programs includes software and/or terminal devices providing common access to equipment in said customer premises installation and to said integrated services control point via the signaling interface.

7. A system according to claim 5 further comprising programming circuitry for commonly programming the programmable database and the integrated services control point via the signaling interface from the customer premises equipment.

8. A system according to claim 5 wherein said call control logic, storage and circuitry effects programming of network control functions of said customer premises equipment installation and said public switched telephone network.

9. A system according to claim 8 wherein said programming includes provisioning.

10. A system according to claim 5 including in said customer premises equipment installation an integrated services control point implementing said call control logic, and storage to perform said customer premises equipment and network service logic programs.

11. A system according to claim 5 wherein said customer signaling system comprises a common channel signaling system.

12. A system according to claim 11 wherein said common channel signaling system includes a signal transfer point.

13. A telecommunications system comprising:

a public switched telephone network having a common channel signaling system and an integrated services control point operative to perform network service logic programs to facilitate line status monitoring, inter-node switching system circuit connections, and information exchange services and features;

a customer premises equipment installation including multiple telecommunication terminals and call control logic, storage and circuitry operative to perform customer premises equipment and network service logic programs to facilitate on premises line status monitoring, on premises inter-node switching circuit connections, and on premises information exchange services and features for processing telecommunications calls between said on premises telecommunication terminals and between said on premises telecommunication terminals and off premises telecommunications terminals connected to said public switched telephone network;

said customer premises equipment installation including a customer signaling system by which signals are conveyed within the customer premises equipment for effecting said control and information functions; and a signaling interface for providing a connection between said customer signaling system and the signaling system of said switched telephone network whereby control signals for coordinating and integrating operations between said switched telephone network and said customer premises equipment installation are transmitted therebetween, wherein connection of the voice portion of a call from said customers premises installation to said public switched telephone network is made only upon ascertaining that the called terminal device is not busy.

14. A method of operating a communications system which communication system comprises;

a public switched telephone network having a common channel signaling system and an integrated services control point operative to perform network service logic programs to facilitate line status monitoring, inter-node switching system circuit connections, and information exchange services and features;

a customer premises equipment installation including multiple telecommunication terminals connected to programmable switching means connected to said public switched telephone network, and a programmable processor having storage and providing control for a customer premises equipment signaling system controlling said programmable switching means;

said method comprising the steps of:

programming said programmable processor to perform customer premises equipment and network service logic programs to facilitate on premises line status monitoring, on premises inter-node switching circuit connections, and on premises information exchange services and features for processing telecommunications calls between said on premises telecommunication terminals and between said on premises telecommunication terminals and off premises telecommunications terminals connected to said public switched telephone network;

pursuant to said processor programming receiving and responding via said customer premises equipment signaling system to signaling inquiries initiated in said common channel signaling system in said public switched telephone network and to signaling inquiries initiated in said customer premises equipment installation;

responsive to the responses to said inquiries by said processor initiating inter-node switching system circuit connections for processing telecommunications calls between said on premises telecommunication terminals and between said on premises telecommunication terminals and off premises telecommunications terminals connected to said public switched telephone network.

15. A method of operating a communications system which communication system comprises;

a public switched telephone network having a common channel signaling system and an integrated services control point operative to perform network service logic programs to facilitate line status monitoring, inter-node switching system circuit connections, and information exchange services and features;

a customer premises equipment installation including multiple telecommunication terminals connected to programmable switching means connected to said public switched telephone network, and a programmable processor having storage and providing control for a customer premises equipment signaling system controlling said programmable switching means;

said method comprising the steps of:

programming said programmable processor to perform customer premises equipment and network service logic programs to facilitate on premises line status monitoring on premises inter-node switching circuit connections, and on premises information exchange services and features for processing telecommunications calls between said on premises telecommunication terminals and between said on premises telecommunication terminals and off premises telecommunications terminals connected to said public switched telephone network;

pursuant to said processor programming receiving and responding via said customer premises equipment signaling system to signaling inquiries initiated in said common channel signaling system in said public switched telephone network and to signaling inquiries initiated in said customer premises equipment installation;

responsive to the responses to said inquiries by said processor initiating inter-node switching system circuit connections for processing telecommunications calls between said on premises telecommunication terminals and between said on premises telecommunication terminals and off premises telecommunications terminals connected to said public switched telephone network, and establishing a voice circuit between said public switched telephone network and said customer premises equipment installation only after determining that the called terminal is not busy.

16. A method according to claim 15 wherein the called terminal is on said customers premises.

17. A method according to claim 15 wherein the called terminal is off said customers premises.

18. A method according to claim 15 wherein said programmable switching means comprises a private branch exchange (PBX).

* * * * *